US005853838A

United States Patent [19]

Siems et al.

[11] Patent Number: 5,853,838

[45] Date of Patent: Dec. 29, 1998

[54] SHIM

[75] Inventors: Stanley J. Siems, Ackley; Jerry L. O'Donnell; Robert J. Connell, both of Waterloo, all of Iowa

[73] Assignee: Doc's Products L.C., Waterloo, Iowa

[21] Appl. No.: 862,514

[22] Filed: May 23, 1997

[51] Int. Cl.[6] .......... B32B 31/18

[52] U.S. Cl. .......... 428/43; 156/247

[58] Field of Search .......... 428/43; 156/247

[56] References Cited

U.S. PATENT DOCUMENTS 4,232,068 11/1980 Hoh et al. .......... 428/83 X
4,281,302 7/1981 Stegens .......... 333/204
4,526,641 7/1985 Schriever et al. .......... 428/473.5 X

*Primary Examiner*—Henry F. Epstein
*Attorney, Agent, or Firm*—Zarley, McKee, Thomte, Voorhees & Sease

[57] ABSTRACT

An improved shim such as is used to wedge between door frames and walls in construction applications. The improved shim is made of a non-wood material which resists splintering, splitting, and compression. It also resists decay, rot and degradation over time. The shim is an elongated wedge-shape. It can include transverse slots, grooves, or scores which make it frangible at various locations along its length to size it to different lengths. The improved shim can be manufactured linked end-to-end and foldable into a compact stack.

23 Claims, 5 Drawing Sheets

SHIM

BACKGROUND OF THE INVENTION

1. Field of the Invention

The present invention relates to shims, and in particular, to an improved shim that can be used for most, if not all conventional shim uses, including in construction such as squaring up door frames. The present invention also relates to the method of manufacturing and packaging shims.

2. Problems in the Art

Shims are a widely known and used construction help. Based on the principle of a wedge, shims are many times used to square up or properly space a door frame from the walls that surround the door frame.

Shims are usually formed of wood. Many times they are simply scraps of wood that are placed either singly or together into gaps or spaces between such things as the door frame and the wall, to hold the frame in a certain position or orientation.

One type of shim is pre-manufactured to a general size on the order of nine inches long by a couple of inches wide, and made of varying thickness (generally from a very small part of an inch up to perhaps one-half inch thick, in a wedge shape. The shim is inserted until the desired thickness exists for the application. Any unneeded part of the shim extending or protruding from the frame is broken off or sawed off. This type of shim avoids having to try different scraps of wood, alone or in combination, to find a fit.

The use of wood for shims is part familiarity, part flexibility and part availability. Wood has long been the material of choice in many construction projects, particularly residential. Scraps are always available. Historically wood has been relatively inexpensive. Also, of course, wood is relatively easy to work--to form, to adjust in size, and to handle.

However, conventional wood shims have certain deficiencies that provide room for improvement in the art. First, wood pieces of this size can split or splinter relatively easily, especially if forced into position and/or struck with a hammer or tool. Splitting or splintering can defeat the purpose of the shim and can cause safety problems. Second, the inherent properties of wood, being relatively porous, means that wood tends to compress, especially if substantial compression forces are applied against it. This too can defeat, somewhat, the purpose of the shim. Third, as an organic material, wood can decay or degrade over time. Fourth, although relatively easy to handle and alter in size, it may require tools and substantial handling which is time-consuming.

Materials other than wood tend to be too expensive, i.e. the cost of the material and/or the cost to fabricate the shims, to be practical.

It has also been discovered that room for improvement exists with respect to the manufacturing and packaging of shims. Wood shims are independent pieces that must be collected then either sold individually or in a package loose. If they are to be positioned in any order to conserve space and/or to provide for more uniform or easier packaging, this requires significant manual labor and/or some sort of binding device such as a rubber band or the like.

Often times shims are nailed into place so as not to fall or slide. This is usually done when an exact location must be maintained. The problem with the wooden shim is that it does not always hold a nail, resulting in a shim that falls or will not maintain a constant location. The plastic shim firmly holds a nail or screw in place without splitting or compromising its position.

Therefore, a real need in the art has been identified. It is therefore a principle object of the present invention to overcome the problems and deficiencies in the art.

A still further object to the present invention is to provide an improved shim which:

1. does not splinter when forced or hammered into a space.
2. does not split with normal handling or hammering.
3. resists degradation and does not decay or rot.
4. resists compression.
5. is flexible in application and use.
6. is adjustable in size.
7. is durable.
8. is economical to manufacture.
9. is able to be manufactured so that multiple shims can be linked together and easily manipulated into a compact, symmetrical shape for easier and improved packaging and marketing.

These and other objects, features, and advantages of the present invention will become more apparent with reference to the accompanying specification and claims.

SUMMARY OF THE INVENTION

The present invention is an improved shim. The shim has a wedge-like shape. It can be made of a material that resists or eliminates splintering, splitting or compression, as well as resists degradation over time. It also can include structural characteristics that promote breaking the shim at selected locations to adjust its size.

The shim therefore is easily adapted for a variety of different uses and situations, does not require extensive customization, and is durable and economical.

An additional aspect of the present invention is an apparatus and method of manufacturing and packaging a plurality of shims.

DETAILED DESCRIPTION OF THE PREFERRED EMBODIMENT

Figure 1:
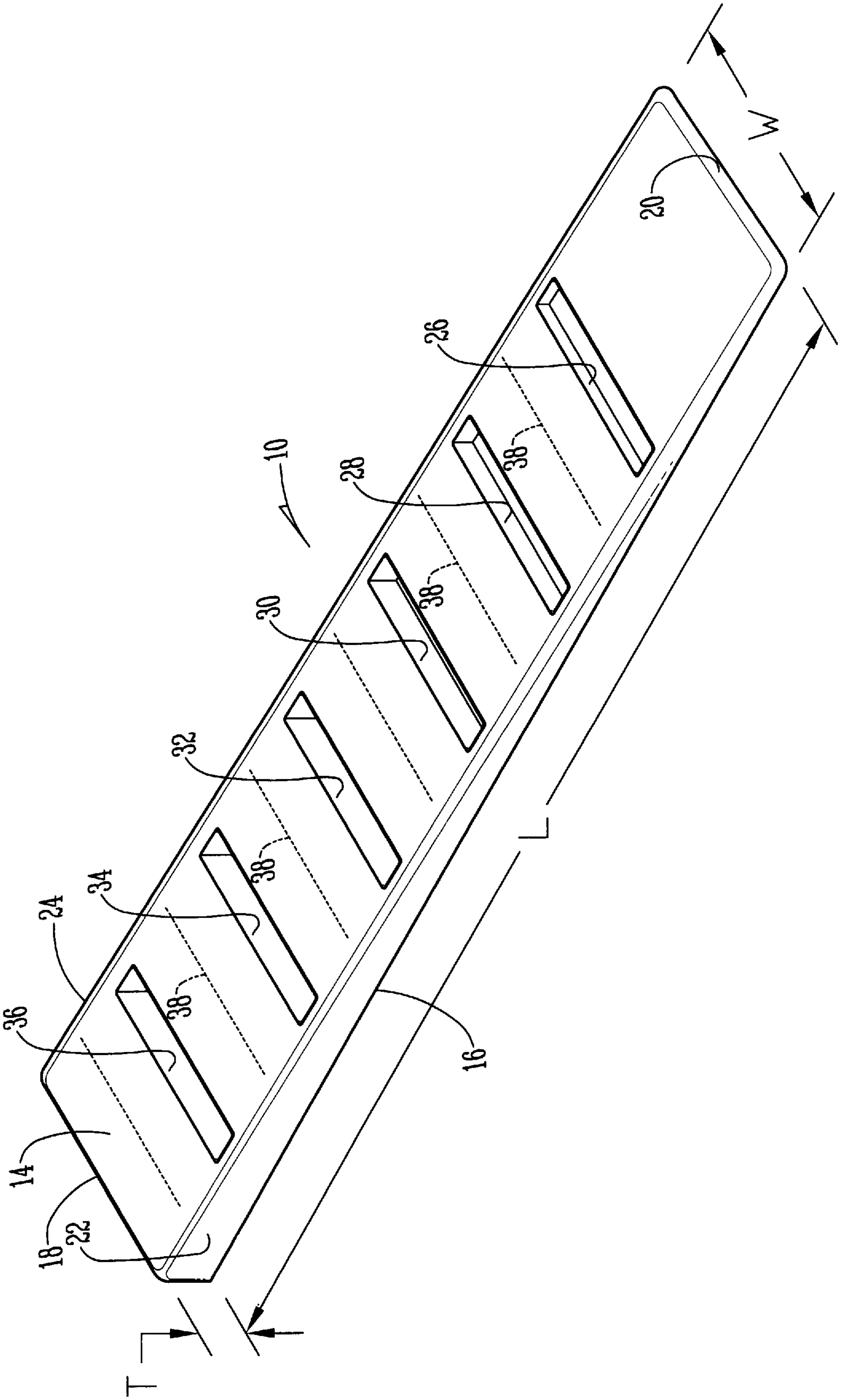
FIG. 1 is a perspective view of an apparatus according to the present invention.

To assist in a better understanding of the invention, one embodiment the invention can take will now be described in detail. Frequent reference will be taken to the drawings. Reference numbers will be used to indicate certain parts or locations in the drawings. The same reference numerals will be used to indicate the same parts and locations throughout all the drawings unless otherwise stated.

FIG. 1 shows a shim 10 according to the present invention. It is to be understood that shim 10 will be discussed mainly in the context of use in construction, to be placed, for example, between a door frame and adjacent walls. Such uses of shims are well known in the art, and the precise aspects of using the same will not be discussed here. However, it is to be understood that shim 10 can be used in a variety of different ways, for a variety of different applications.

Shim 10 comprises a body having a top surface 14, bottom surface 16 (see FIG. 4), opposite ends 18 and 20, and opposite sides 22 and 24. As shown in FIG. 1, shim 10 has a length L, a width W and a thickness T. Shim 10 is wedge-shaped in that its cross-sectional thickness T increase from end 20 to end 18.

Here the dimensions of shim 10 are: L=7½"; W=1½"; and T=approx. 1/32" at end 20 to 3/8" at end 18.

Shim 10 is made of a solid material, here out of a material that resists or precludes splintering, splitting, and compressing under normal circumstances. It also resists or precludes degradation by rotting or decay. An example is high density polyethylene. Another example is recycled plastic. The latter is quite inexpensive, and therefore would make shim 10 very attractive from the perspective of price in combination with its features.

Shim 10 therefore would have some flexibility and resilience, yet would be rigid and not deform under normal pressures or pounding. Its wedge-shape would allow it to be driven, end 20 first, into a narrow gap and the increasing thickness then wedge into that space.

Figure 5:
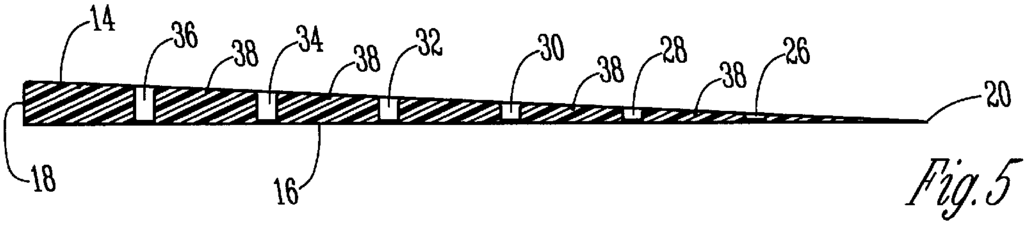
FIG. 5 is a sectional view taken along line 5—5 of FIG. 3.

Furthermore, shim 10 includes a plurality of parallel, generally equally spaced depressions or grooves 26, 28, 30, 32, 34, and 36, that extent laterally across most of the width of shim 10. As shown in FIG. 5, the depth of each groove varies. Essentially each extends through the thickness T of shim 10 and terminates approximately the same distance from back side 16.

The main purpose of grooves 26, 28, 30, 32, 34, 36, is to allow a user to manually break off a piece of shim 10 at any one of the grooves. Shim 10 is essentially frangible at those locations, allowing the length L of shim 10 to be shortened if needed to a variety of lengths. On the other hand, the construction of the grooves is such that they do not materially alter the characteristics of shim 10, in the sense, it still does not splinter or split, it does not compress, and it pounds into spaces and wedges in place without deformation. Here grooves are approximately 3/16" width, 1¼" in length (laterally across shim 10), and extending from surface 14 to within about 1/64" of bottom surface 16. Also, groove 36 is centered about 1" inward from end 18, and succeeding grooves 34, 32, etc. are centered about 1" apart from one another. Thus because shim 10 is 7½" long, end 20 is about 1½" from groove 26.

Figure 2:
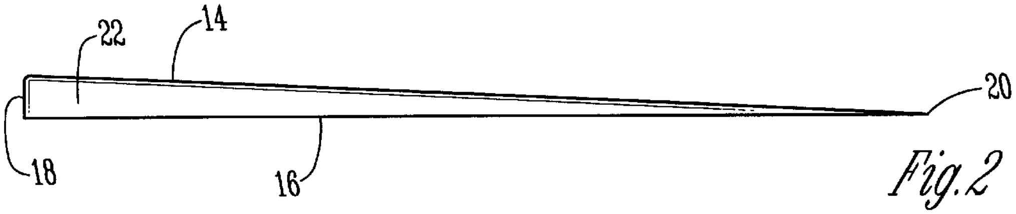
FIG. 2 is a side elevational view of the device of FIG. 1.

FIG. 2 illustrates the wedge-shape of shim 10. The precise angle between sides 14 and 16 can vary. The angle of shim 10 can be mathematically calculated by using the dimensions given above.

Figure 3:
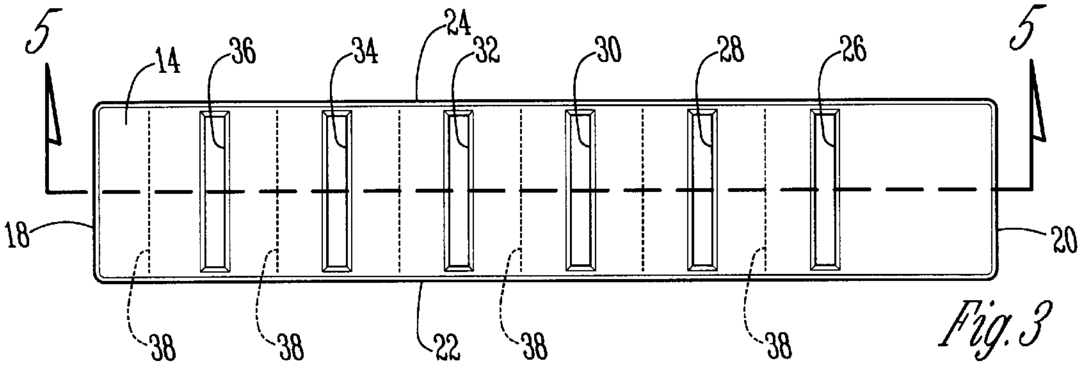
FIG. 3 is a top plan view of the device of FIG. 1.
Figure 4:
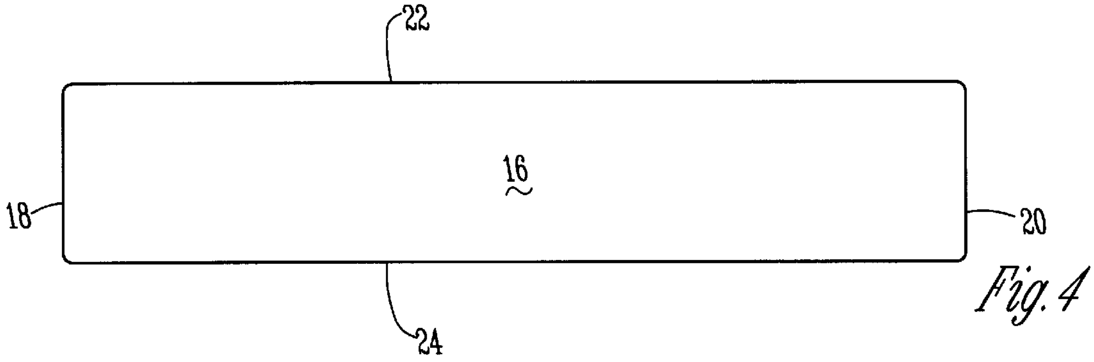
FIG. 4 is a bottom plan view of the apparatus of FIG. 1.

FIG. 3 illustrates the location of the grooves. FIG. 4 illustrates that bottom side 16 is smooth. It is to be understood, however, that the grooves could be in either side, or could be on both sides or alternate on different sides.

Figure 6:
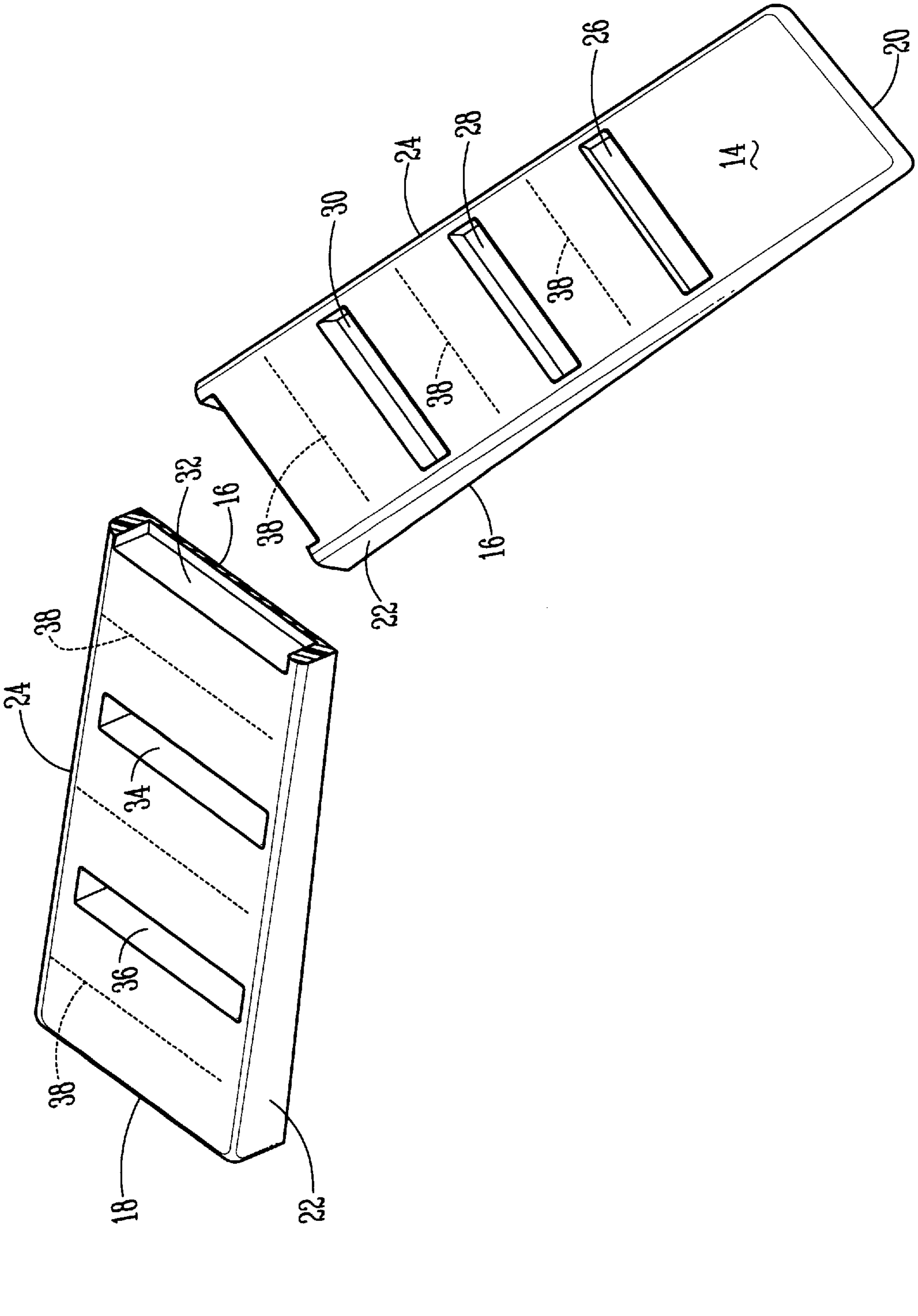
FIG. 6 is a perspective view like FIG. 1 but showing the apparatus broke into two pieces.
Figure 7:
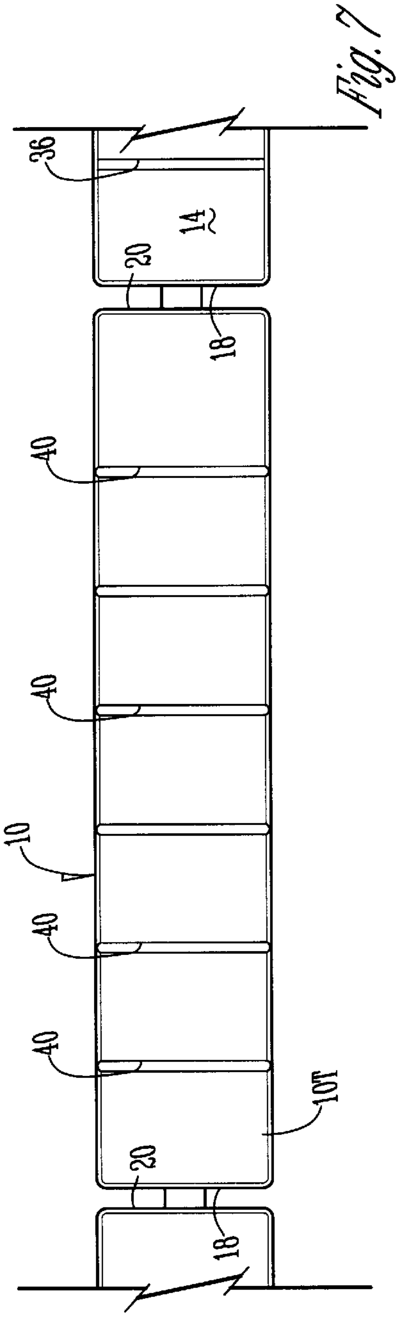
FIG. 7 is a top plan view of several shims manufactured in a linked manner.

FIG. 6 illustrates how shim 10 could be broken apart at groove 32. The right-most piece, including end 20, could be driven into a gap or space. The other piece, including end 18 could be discarded.

In one application, shim 10 would be driven into a gap or space between a wall and a door frame. It would be driven until the frame is held or moved to a desired orientation. If any part of shim 10 protrudes from the frame, it can be easily broken off by simply bending shim 10 at the appropriate groove. The groove acts as to make shim 10 frangible at that location. Once the protruding section is removed, the remainder still functions correctly as a shim, and is flush with the frame so that the door and walls can be finished.

Once in place, the material of shim 10 does not compress, even if shim 10 experiences substantial compressing forces. Also, it does not degrade, for example if it experiences water. It also deters degradation by insects or animals or other environmental elements.

FIGS. 7–10 illustrate another aspect of the invention. Shims 10, according to the present invention and as previously shown and described, can be manufactured so that a hinging tab 42 links successive shims 10 in a chain of shims 10. Because shims can be manufactured of plastic, an entire linked string of shims 10 can be manufactured with a hinging tab 42 made of the same plastic material between each shim 10.

The size of tab 42 can be approximately 0.25 inches laterally and generally centered between adjacent ends of two shims 10. The gap between the shims can be approximately 0.20 inches and hinge tab 42 can be approximately 0.10 inches thick.

Figure 8:
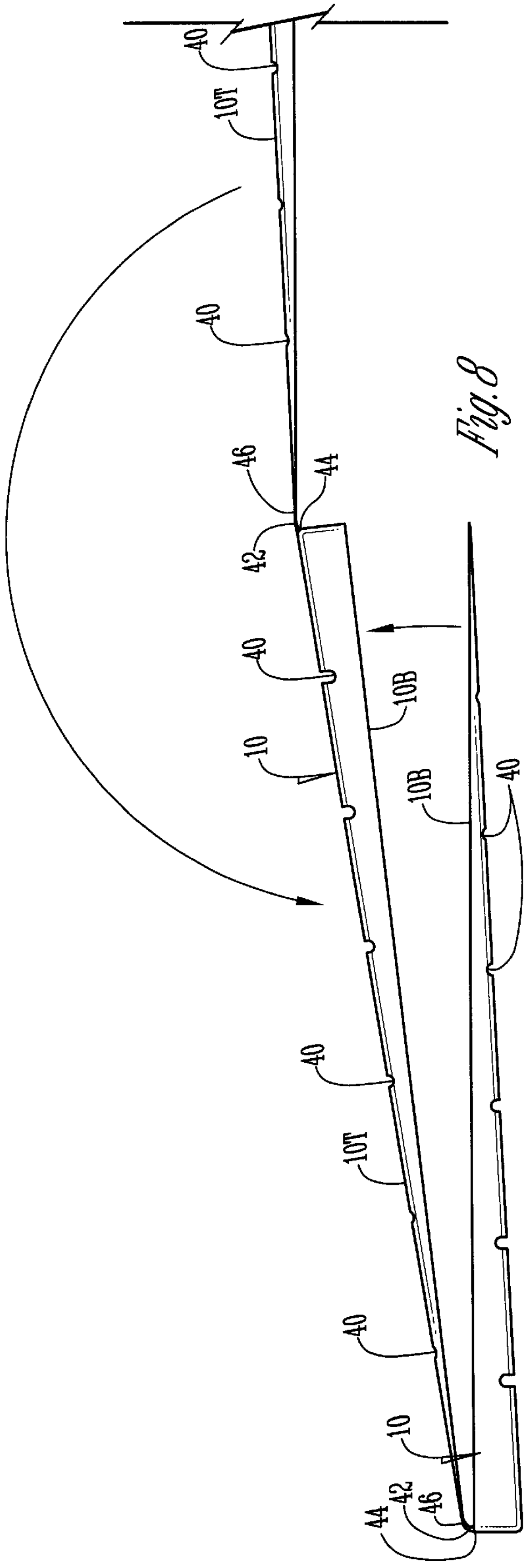
FIG. 8 is a side elevational view showing how the linked shims can be folded upon one another.
Figure 10:
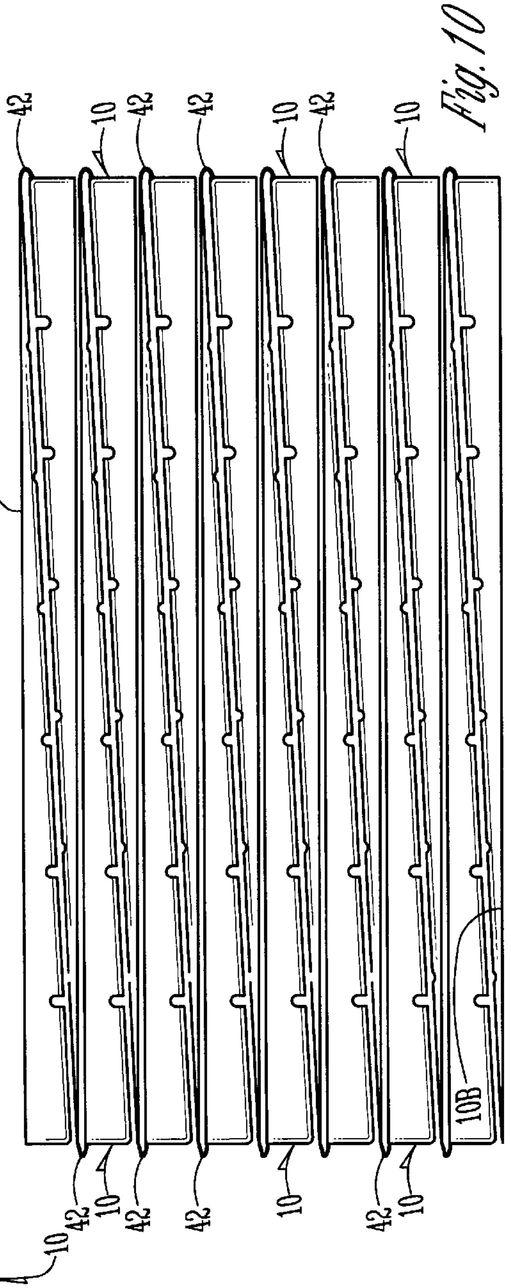
FIG. 10 is a side elevational view similar to FIG. 9, but showing the plurality of linked shims in a completely folded arrangement.
Figure 9:
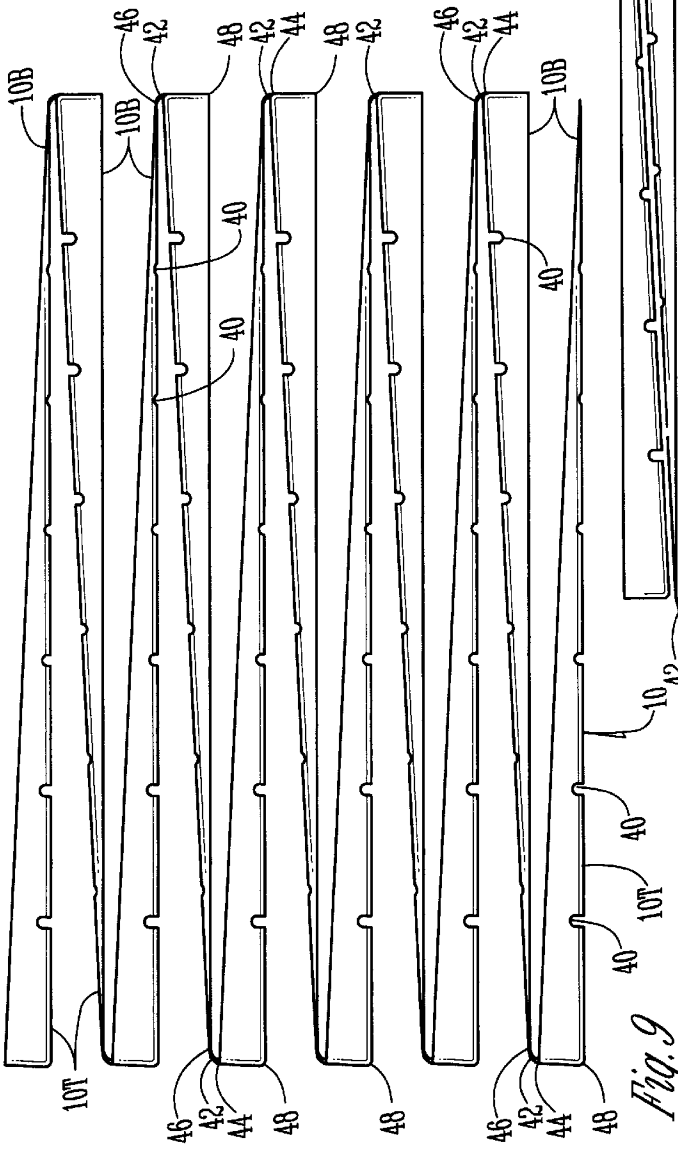
FIG. 9 is a side elevational view of a plurality of linked shims shown in a semi-folded arrangement.

FIG. 9 illustrates how the shims 10 would be linked. The thin end of each shim would be linked to the thick end of the succeeding shim 10. Reference numerals 10 and 10B in FIG. 9 illustrate the top (10T) and bottom (10B) of each shim 10 respectively. Also, the figures illustrate that serrations or transverse channels 40 can be placed along the length of shims 10 and function similarly to either break lines 38 or grooves 26, 28, 30, 32, 34, and 36. Transverse channels 40 could be U-shaped in cross section, V-shaped, or otherwise provide a score or break, even a portion of the way across shim 10, to assist in braking shim 10. FIGS. 8, 9, and 10 illustrate how the string of shims 10, linked by hinging tabs 42, could be folded up into a compact symmetrical stack that could be easily packaged. The folded up combination would also lend overall durability to the plurality of shims 10 during transportation and marketing of the same. The small hinged tabs 42 can be frangible, or at least can be relatively easily be broken, to allow easy removal of shims from the string of shims. The remainder of the shims 10 can be left in the stacked form to be compactly storable.

FIG. 10 shows 14 shims stacked together. As can be easily appreciated, various numbers of shims can be manufactured according to this method.

The included preferred embodiment is given by way of example only, and not by way of limitation to the invention, which is solely described by the claims herein. Variations obvious to one skilled in the art will be included within the invention defined by the claims.

For example, holder 10 is made out of a number of materials. Plastics are generally preferred. Examples are polypropylene and polyethylene. The characteristics needed are set forth above including being able to be pounded by a hammer or the like into place, taking on and hold a nail or screw, and withstanding compressive or other forces over time and varying environmental conditions. Other materials are possible, however. Recycled plastic is a good candidate because it is generally cheaper than non-recycled plastic and many other materials, but can be molded or otherwise economically manipulated to create shims 10.

Also, as illustrated in FIGS. 1, 3, and 6, additional structural features could be added to shim 10 to increase the number of locations where it could be broken apart. Lines 38 are intended to show the location of score lines that could be placed in surface 14 of shim 10. The depth of the lines 38 could vary, but would assist shim 10 in being frangible at those locations.

The plastic shims are better material than wood when leveling heavy objects such as a stove, refrigerator, furnace, air conditioner, toilet, cabinets, counter tops, and work benches. This shim will not compress and can be placed in areas where water exists and still resist rotting.

Exterior applications include decks, pre-stressed concrete floors for hog confinements and other animal housing. Other applications include bridges, cement porches and other forms of construction where the shim might be effected by moisture, compression or insects.

If someone chooses to break the shim in on, area that has not been pre-influenced, they simply score it with a utility knife and hit it with a hammer.

As previously mentioned, the shape and depth of pre-influenced areas (such as channels 40, break lines 38 or grooves 26, 28, 30, 32, 34, and 36)can vary, if used. In FIGS. 7–10, the depth of channels 40 increases slightly from thin end to thick end, e.g. from approximately 1/32" deep to approximately 1/8" deep respectively.

Shims 10 can be manufactured by a number of methods widely known in the art. An example is injection molding.

The preferred plastic is a combination of 95% high density polyethylene and 5% low density polyethylene.

What is claimed is:

1. An improved shim comprising:

a solid wedge-shaped body having opposite ends, top and bottom surfaces, and opposite sides, the top and bottom surfaces diverging between opposite ends; and the body being made one-piece and of a moldable synthetic material that deters splintering, splitting and compression.

2. The shim of claim 1 wherein the material deters rotting or degradation over time.

3. The shim of claim 1 wherein the material is a plastic.

4. The shim of claim 3 wherein the plastic is a high-density polyethylene.

5. The shim of claim 3 wherein the plastic is recycled plastic.

6. The shim of claim 1 further comprising the body is frangible at a plurality of locations along its length.

7. The shim of claim 1 further comprising a plurality of reduced cross sectional thickness areas along the length of the body.

8. The shim of claim 7 wherein the reduced cross sectional thickness areas comprise grooves in the body, transverse across the body.

9. The shim of claim 8 wherein the grooves extend transversely across the body but do not extend to opposite sides of the body.

10. The shim of claim 1 further comprising a plurality of score lines transverse the body along the length of the body.

11. The shim of claim 1 wherein the body is approximately one to twelve inches long, and one-half to five inches wide.

12. The shim of claim 11 wherein the body at one end is approximately one sixty-fourth inch thick and linearly increases in thickness to between one-quarter and one-half inch.

13. An improved shim comprising:

a solid body having a longitudinal axis, first and second opposite ends along the longitudinal axis, a top and bottom, and opposite sides, the top and bottom surfaces diverging between opposite ends; and the body being made of a solid moldable synthetic material which resists splintering, splitting, and compression.

14. The shim of claim 13 wherein the body increases in cross-sectional thickness between the first end and the second end.

15. The shim of claim 14 wherein the material is a plastic.

16. The shim of claim 15 further comprising spaced-apart break portions extending at least partially transversely across the body long the longitudinal axis.

17. The shim of claim 16 wherein the break portions comprise score lines.

18. The shim of claim 16 wherein the break portions comprise grooves in the body.

19. The shim of claim 18 wherein the thicker the body, the deeper the grooves are in the body.

20. A device for wedging between two items comprising:

a wedge-shaped shim;

the shim made of a solid one-piece and moldable synthetic material that deters splintering, splitting and compression.

21. A method of manufacturing a plurality of shims comprising:

forming a plurality of wedged-shaped shims each interconnected by a frangible link at adjacent ends;

folding the plurality of shims one upon the other by hinging action of links so that succeeding shims fold upon one another with thicker ends of succeeding shims adjacent thinner ends of preceding shims;

so that once folded down together the plurality of shims form a compact end generally symmetrical combination.

22. A plurality of shims comprising:

a first shim having first and second opposite ends;

a second shim having opposite ends;

a frangible link between a second end of the first shim and the first end of the second shim;

the frangible link being foldable to allow the first shim to be folded down onto the second shim.

23. The plurality of shims of claim 22 further comprising third and subsequent shims attached second end to first end by a frangible link.

* * * * *